(12) United States Patent
Kim et al.

(10) Patent No.: US 9,071,820 B2
(45) Date of Patent: Jun. 30, 2015

(54) APPARATUS FOR DISPLAYING A 3D IMAGE AND CONTROLLING METHOD THEREOF BASED ON DISPLAY SIZE

(75) Inventors: Juok Kim, Chungbuk (KR); Yeonjoo Kang, Seoul (KR); Youngrae Hong, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 465 days.

(21) Appl. No.: 13/191,895

(22) Filed: Jul. 27, 2011

(65) Prior Publication Data
US 2012/0169850 A1 Jul. 5, 2012

(30) Foreign Application Priority Data
Jan. 5, 2011 (KR) .................. 10-2011-0000776

(51) Int. Cl.
*H04N 13/02* (2006.01)
*H04N 13/00* (2006.01)
*H04N 5/225* (2006.01)

(52) U.S. Cl.
CPC ......... *H04N 13/0022* (2013.01); *H04N 5/2252* (2013.01); *H04N 13/0033* (2013.01); *H04N 13/0282* (2013.01)

(58) Field of Classification Search
CPC ............ H04N 13/0282; H04N 5/2252; H04N 13/0022; H04N 13/0033; H04N 13/0474; H04N 5/23216; H04N 5/23238; H04N 5/23293; H04N 5/2254; G03B 17/12; G03B 17/14; G03B 37/565
USPC ............. 348/47, 48; 463/33; 382/154; 359/9; 356/604; 370/463; 707/10
See application file for complete search history.

(56) References Cited

U.S. PATENT DOCUMENTS 5,493,427 A * 2/1996 Nomura et al. .................. 349/5
6,476,850 B1 11/2002 Erbey
(Continued)

FOREIGN PATENT DOCUMENTS

CN 101895779 11/2010
EP 2 315 452 A2 4/2011
(Continued)

OTHER PUBLICATIONS

European Search Report dated Mar. 13, 2012 for Application 11006849.1.
(Continued)

*Primary Examiner* — Richard Torrente
*Assistant Examiner* — Joseph Suh
(74) *Attorney, Agent, or Firm* — Ked & Associates, LLP

(57) ABSTRACT

An apparatus for displaying an image and controlling method thereof are disclosed, by which a more convenient and pleasant 3D stereoscopic image appreciating environment can be provided to a user. The present invention includes a display unit including a parallax generating means for displaying a 3D stereoscopic image of a binocular disparity type, a memory unit configured to store first to third images, and a controller determining a prescribed display condition, the controller, if a first condition is met, controlling the 3D stereoscopic image to be displayed via the display unit using the first image and the second image, the controller, if a second condition is met, controlling the 3D stereoscopic image to be displayed via the display unit using the first image and the third image. Preferably, the first to third images include images of a common object in different viewpoints, respectively.

17 Claims, 16 Drawing Sheets

(56) References Cited

U.S. PATENT DOCUMENTS

| | | | |
|---|---|---|---|
| 7,583,327 B2 | 9/2009 | Takatani | 349/15 |
| 7,796,155 B1* | 9/2010 | Neely et al. | 348/157 |
| 2002/0024592 A1* | 2/2002 | Uomori et al. | 348/42 |
| 2004/0219980 A1* | 11/2004 | Bassett et al. | 463/33 |
| 2005/0089212 A1 | 4/2005 | Mashitani et al. | |
| 2006/0146125 A1* | 7/2006 | Yamada | 348/51 |
| 2006/0233191 A1* | 10/2006 | Pirzada et al. | 370/463 |
| 2007/0071107 A1* | 3/2007 | Ha | 375/240.24 |
| 2007/0121182 A1* | 5/2007 | Fukushima et al. | 359/9 |
| 2007/0122027 A1* | 5/2007 | Kunita et al. | 382/154 |
| 2007/0229850 A1* | 10/2007 | Herber | 356/604 |
| 2008/0222156 A1* | 9/2008 | Ryan et al. | 707/10 |
| 2010/0134599 A1* | 6/2010 | Billert et al. | 348/48 |
| 2010/0245573 A1* | 9/2010 | Gomi et al. | 348/148 |
| 2010/0290697 A1* | 11/2010 | Benitez et al. | 382/154 |
| 2011/0083106 A1* | 4/2011 | Hamagishi | 715/836 |
| 2011/0187706 A1* | 8/2011 | Vesely et al. | 345/419 |
| 2011/0211068 A1* | 9/2011 | Yokota | 348/139 |
| 2011/0261166 A1* | 10/2011 | Olazaran | 348/47 |
| 2011/0298795 A1* | 12/2011 | Van Der Heijden et al. | 345/419 |
| 2012/0001899 A1* | 1/2012 | Hong | 345/419 |
| 2012/0002013 A1* | 1/2012 | Asanuma | 348/46 |
| 2012/0019634 A1* | 1/2012 | Jian | 348/54 |
| 2012/0081519 A1* | 4/2012 | Goma et al. | 348/47 |
| 2012/0293627 A1* | 11/2012 | Ishii | 348/46 |
| 2012/0300041 A1* | 11/2012 | Hamashima | 348/49 |
| 2013/0076853 A1* | 3/2013 | Diao | 348/14.08 |
| 2013/0208088 A1* | 8/2013 | Ishii et al. | 348/43 |

FOREIGN PATENT DOCUMENTS

| | | |
|---|---|---|
| JP | 2008-103804 A | 5/2008 |
| TW | 262541 A | 11/1995 |
| TW | 201019708 A | 5/2010 |
| TW | 201031178 A | 8/2010 |
| WO | WO 2010/090150 | 8/2010 |

OTHER PUBLICATIONS

Taiwanese Office Action issued in Application No. 100127202 dated May 26, 2014.

European Office Action issued in Application No. 11006849.1 dated Apr. 24, 2015.

* cited by examiner (a)

(b)

(a)

(b)

910 (a) 920

930 (b) 940

APPARATUS FOR DISPLAYING A 3D IMAGE AND CONTROLLING METHOD THEREOF BASED ON DISPLAY SIZE

CROSS-REFERENCE TO RELATED APPLICATION(S)

This application claims priority under 35 U.S.C. §119 to Korean Application No. 10-2011-0000776, filed Jan. 5, 2011, whose entire disclosure is hereby incorporated by reference.

BACKGROUND

1. Field

The present invention relates to an image displaying apparatus, and more particularly, to an apparatus for displaying an image and controlling method thereof. Although the present invention is suitable for a wide scope of applications, it is particularly suitable for appreciating a 3-dimensional image more pleasantly in consideration of an environment for appreciation.

2. Background

Recently, the demand for an image display device of a terminal type is increasing. And, terminals of the image display devices can be classified into mobile/portable terminals and stationary terminals. Moreover, the mobile terminals can be classified into handheld terminals and vehicle mount terminals again in accordance with possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, as a 3-dimensional (hereinafter abbreviated 3D) image of a stereoscopic type (e.g., binocular disparity) can be implemented on a display unit of a mobile terminal, there are ongoing demands for a method of appreciating the 3D stereoscopic image more conveniently and pleasantly.

SUMMARY OF THE INVENTION

Accordingly, the present invention is directed to an apparatus for displaying an image and controlling method thereof that substantially obviate one or more problems due to limitations and disadvantages of the related art.

An object of the present invention is to provide an apparatus for displaying an image and controlling method thereof, by which a more convenient and pleasant 3D stereoscopic image appreciating environment can be provided to a user.

Another object of the present invention is to provide an apparatus for outputting an image and controlling method thereof, by which a 3D stereoscopic image can be appreciated via the apparatus such as a mobile terminal without causing visual discomfort to a user in consideration of an environment for outputting the 3D stereoscopic image.

A further object of the present invention is to provide an apparatus for generating a source image and controlling method thereof, by which a 3D stereoscopic image can be provided without causing visual discomfort to a user in consideration of an environment for outputting the 3D stereoscopic image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for displaying an image according to the present invention includes a display unit including a parallax generating means for displaying a 3D stereoscopic image of a binocular disparity type, a memory unit configured to store first to third images, and a controller determining a prescribed display condition, the controller, if a first condition is met, controlling the 3D stereoscopic image to be displayed via the display unit using the first image and the second image, the controller, if a second condition is met, controlling the 3D stereoscopic image to be displayed via the display unit using the first image and the third image. Preferably, the first to third images include images of a common object in different viewpoints, respectively.

In another aspect of the present invention, an apparatus for displaying an image includes a display unit including a parallax generating means for displaying a 3D stereoscopic image of a binocular disparity type, a memory unit configured to store first to fourth images, and a controller determining a prescribed display condition, the controller, if a first condition is met, controlling the 3D stereoscopic image to be displayed via the display unit using the first image and the fourth image, the controller, if a second condition is met, controlling the 3D stereoscopic image to be displayed via the display unit using the second image and the third image. Preferably, the first to fourth images include images of a common object in different viewpoints, respectively.

In another aspect of the present invention, a method of controlling an image display device includes the steps of determining a prescribed display condition, if a first condition is met as a result of the determining step, displaying a 3D stereoscopic image of a stereoscopic type using a first image and a second image, if a second condition is met as the result of the determining step, displaying the 3D stereoscopic image of the stereoscopic type using the first image and a third image. Preferably, the first to third images include images of a common object in different viewpoints, respectively.

In a further aspect of the present invention, a method of controlling an image display device includes the steps of determining a prescribed display condition, if a first condition is met as a result of the determining step, displaying a 3D stereoscopic image of a stereoscopic type using a first image and a fourth image, if a second condition is met as the result of the determining step, displaying the 3D stereoscopic image of the stereoscopic type using the second image and a third image. Preferably, the first to fourth images include images of a common object in different viewpoints, respectively.

Accordingly, the present invention provides the following effects and/or advantages.

First of all, a user can be provided with a more pleasant 3D stereoscopic image appreciating environment.

Secondly, since a parallax is adjustable in accordance with an appreciation environment of a 3D stereoscopic image, visual discomfort of a user in appreciating the 3D stereoscopic image can be minimized.

Thirdly, the present invention is able to generate a source image of a 3D stereoscopic image using at least one or more cameras.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
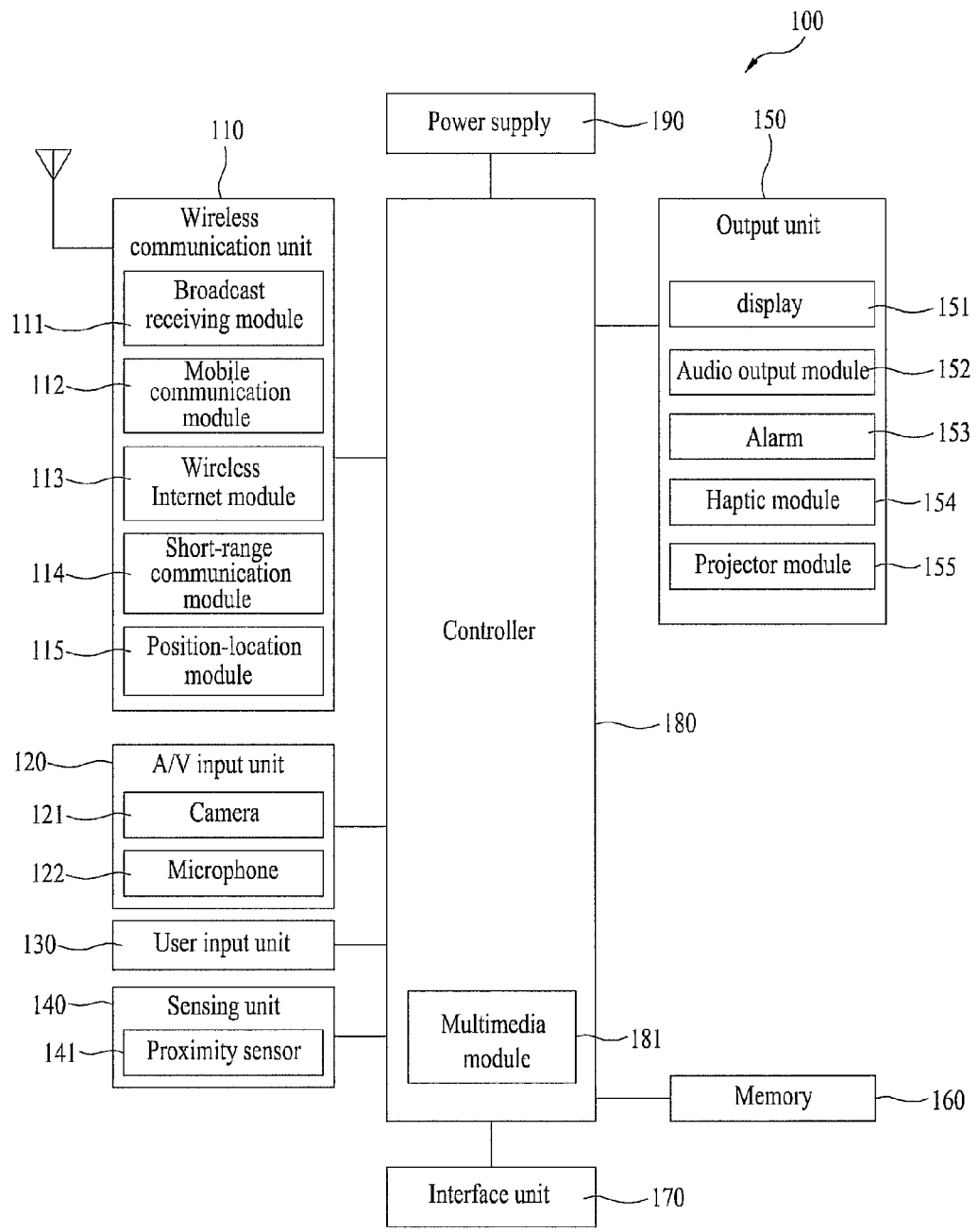
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (NV) input unit 120 is shown configured to provide audio or video signal input to the mobile terminal 100. As shown, the AN input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a louchscreen), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
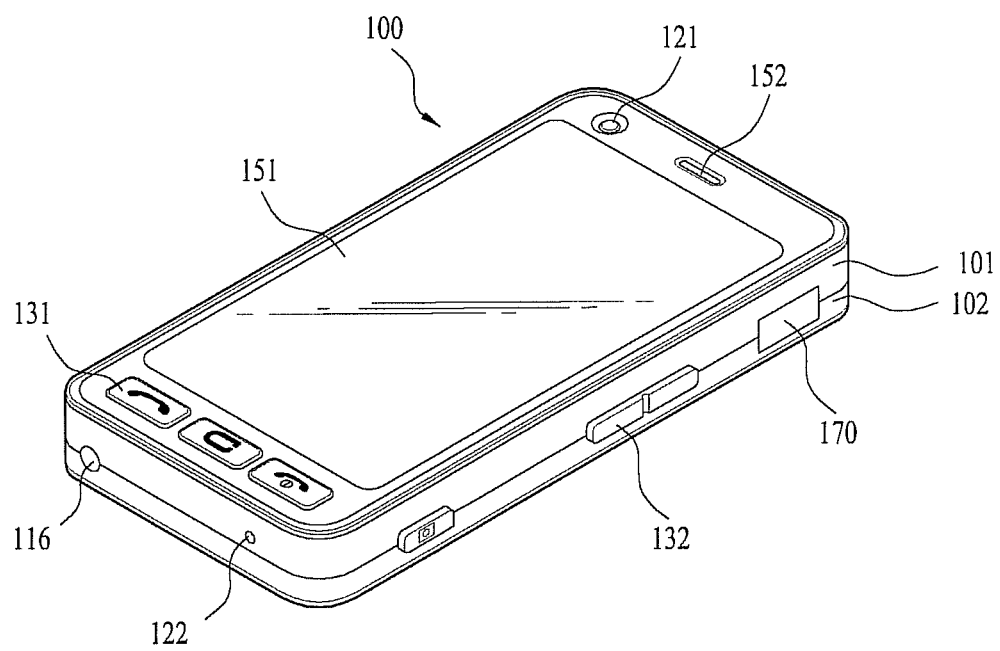
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Implementation of Stereoscopic 3D images

In the following description, a method of displaying a 3D image in a mobile terminal applicable to embodiments of the present invention and a display unit configuration for the same are explained.

One of schemes for implementing a 3D image is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 3 as follows.

Figure 3:
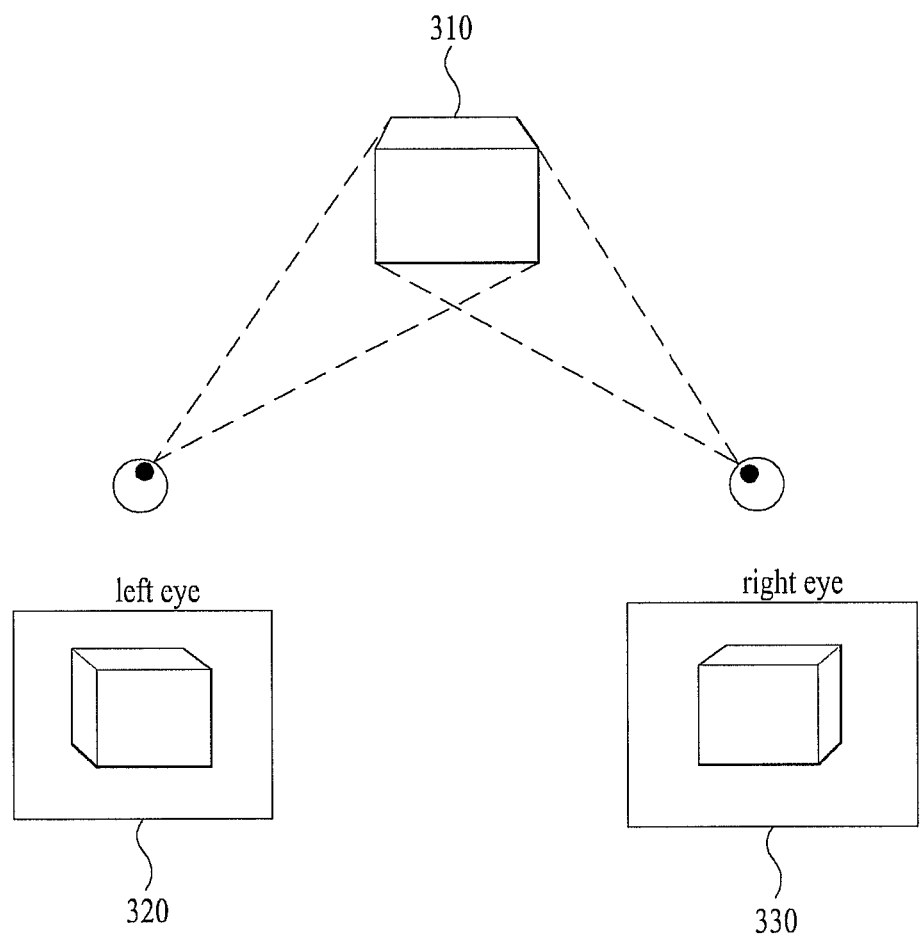
FIG. 3 is a diagram for describing the principle of binocular disparity.

FIG. 3 is a diagram for explaining the principle of binocular disparity.

Referring to FIG. 3, assume a situation that a hexahedron 310 is positioned as a subject in front below an eye's height to be seen through human eyes. In this case, a left eye is able to see a left eye planar image 320 revealing three facets including a top side, a front side and a left lateral side of the hexahedron 310 only. And, a right eye is able to see a right eye planar image 330 revealing three facets including the top side, the front side and a right lateral side of the hexahedron 310 only.

Even if a real thing is not actually positioned in front of both eyes of a user, if the left eye planar image 320 and the right eye planar image 330 are set to arrive at the left eye and the right eye, respectively, a user is able to substantially sense the hexahedron 310 as if looking at the hexahedron 310 actually.

Thus, in order to implement the 3D image belonging to the second category in the mobile terminal 100, images of the same object should arrive at both eyes in a manner of being discriminated from each other for the left and right eye images of the same object with a predetermined parallax.

In the following description, 3D depth attributed to the binocular disparity is explained with reference to FIG. 4.

Figure 4:
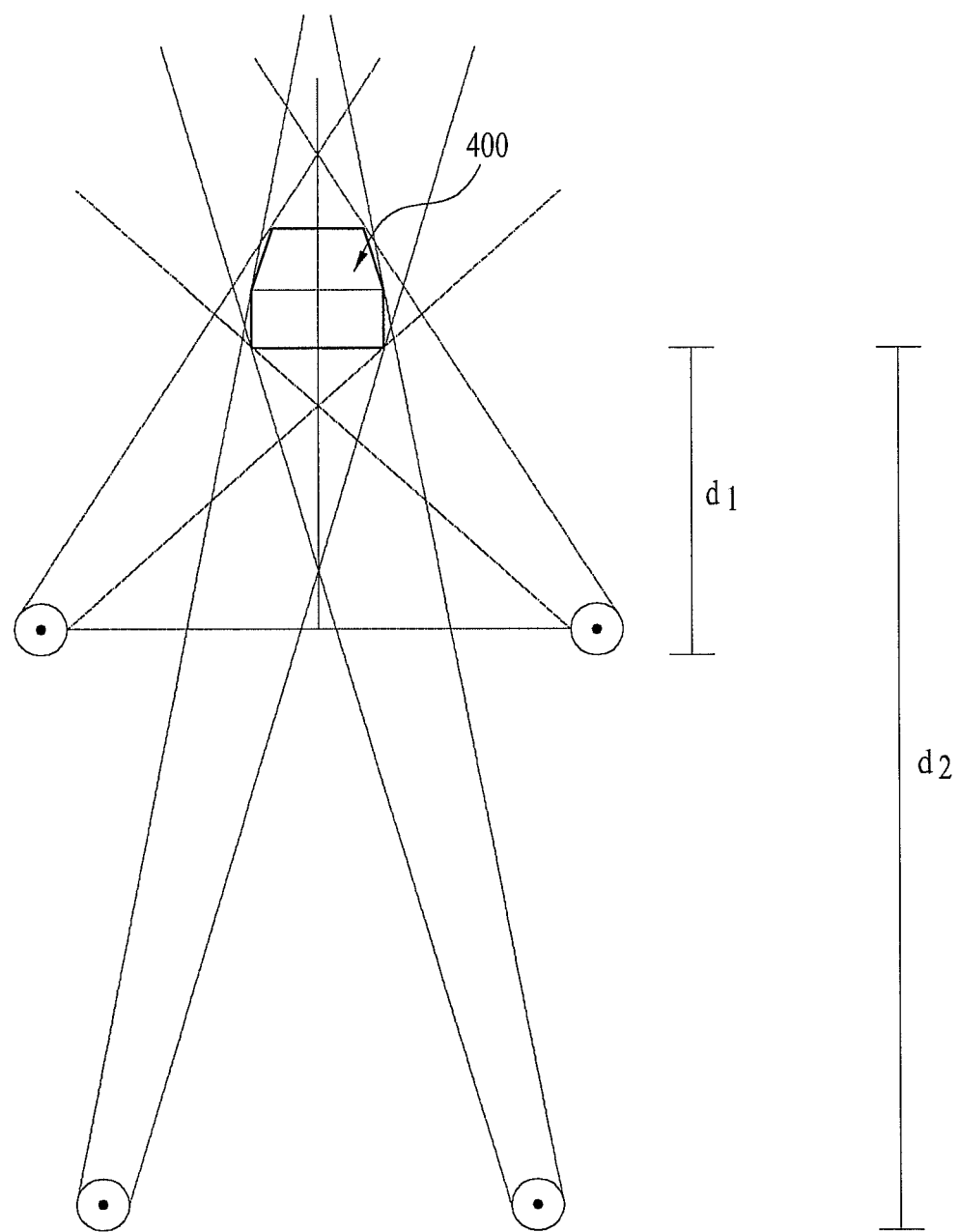
FIG. 4 is a diagram for concept of a sense of distance and 3D depth attributed to binocular disparity.

FIG. 4 is a diagram for concept of a sense of distance and 3D depth attributed to binocular disparity.

Referring to FIG. 4, a lateral side ratio of an image entering each eyeball in view of a hexahedron 500 in a distance d1 trough both eyes is relatively higher than that in a distance d2, whereby a difference between images seen through both eyes increases. Moreover, an extent of a stereoscopic effect sensed by a user in view of the hexahedron 400 in the distance dl can become higher than that in view of the hexahedron 400 in the distance d2. In particular, when a thing is seen through both eyes of a user, a closer subject gives a greater stereoscopic effect, whereas a farther subject gives a smaller stereoscopic effect.

Such a difference in stereoscopic effect can be digitized into a 3D depth or a 3D level. In the following description, a high stereoscopic effect of a thing situated closer shall be represented as a low 3D depth and a low 3D level. And, a low stereoscopic effect of a thing situated farther shall be represented as a high 3D depth and a high 3D level. As the definition of the 3D depth or level is relatively set, a classification reference for the 3D depth or level and an increasing/decreasing direction of the 3D depth or level is changeable.

In order to discriminate the above-mentioned two categories from each other in this disclosure, a stereoscopic image belonging to the first category shall be named '2D stereoscopic image' and a stereoscopic image belonging to the second category shall be named '3D stereoscopic image'.

A method of implementing a 3D stereoscopic image is described as follows.

First of all, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 5 as follows.

Figure 5:
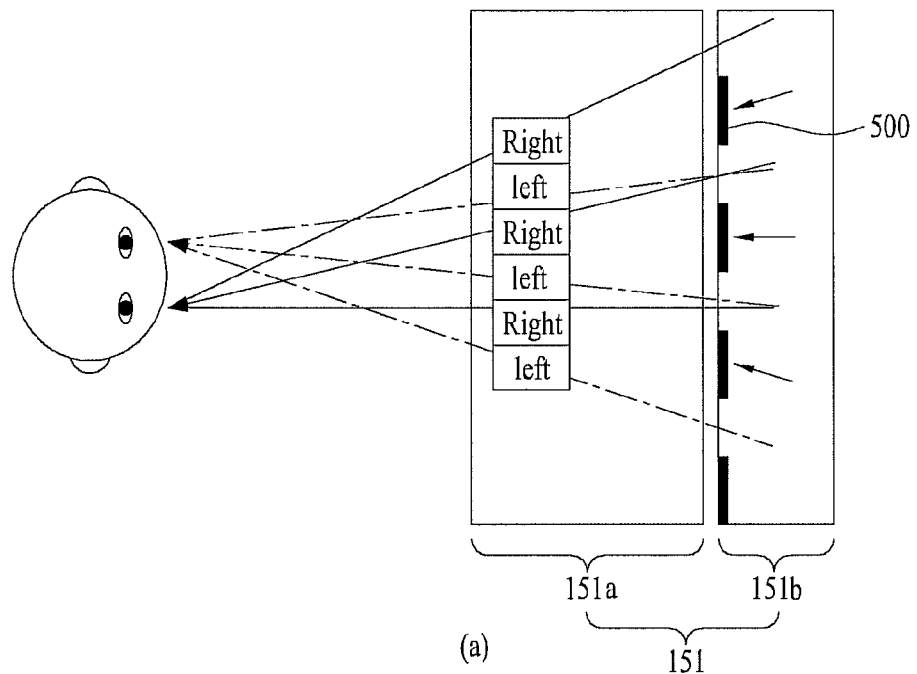
FIG. 5 is a diagram for describing a 3D stereoscopic image displaying method using binocular disparity, which is applicable to embodiments of the present invention.
Figure 5:
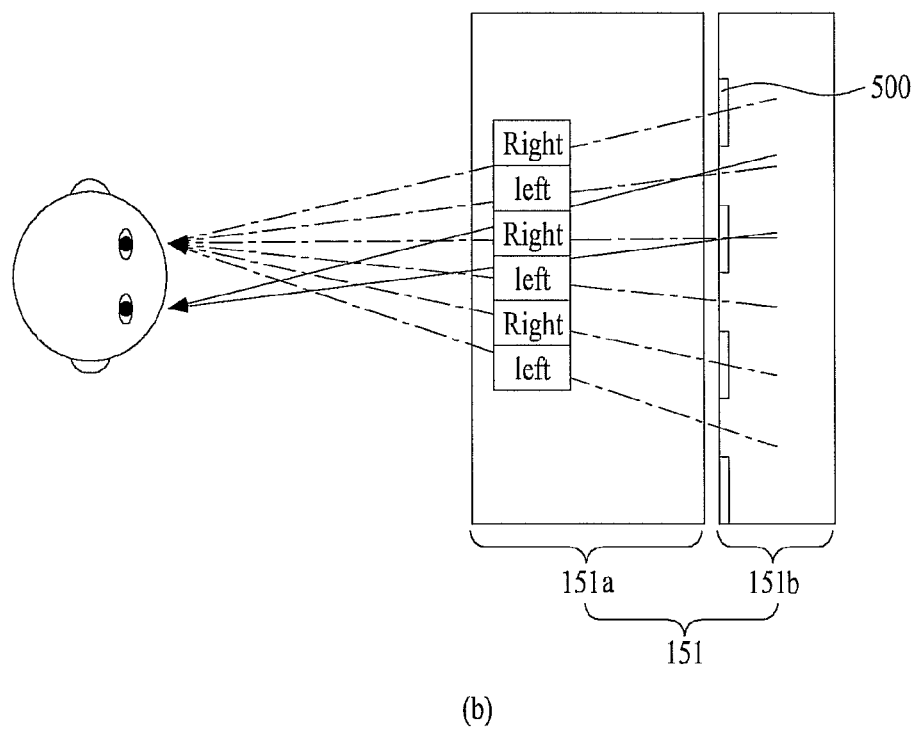

FIG. 5 is a diagram for a scheme of implementing a 3D stereoscopic image in a display unit of a parallax barrier type applicable to embodiments of the present invention.

Referring to FIG. 5, a structure of a parallax barrier type display unit 151 for displaying a 3D image can be configured in a manner that a general display device 151a is combined with a switch LC (liquid crystals) 151b. A propagating direction of light is controlled by activating an optical parallax barrier 500, as shown in FIG. 5(a), using the switch LC 151b, whereby the light is separated into two different lights to arrive at left and right eyes, respectively. Thus, when an image generated from combining an image for the right eye and an image for the left eye together is displayed on the display device 151a, a user sees the images corresponding to the eyes, respectively, thereby feeling the 3D or stereoscopic effect.

Alternatively, referring to FIG. 5(b), the parallax barrier 500 attributed to the switch LC is electrically controlled to enable entire light to be transmitted therethrough, whereby the light separation due to the parallax barrier is avoided. Therefore, the same image can be seen through left and right eyes. In this case, the same function of a conventional display unit is available.

In particular, FIG. 5 exemplarily shows that the parallax barrier performs parallel translation in one axial direction, by which the present invention is non-limited. Alternatively, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

In the following description, assume that a mobile terminal according to one embodiment of the present invention is able to provide a user with a 3D stereoscopic image via the display unit 151 by one of the above described methods.

Since the 3D image principle described with reference to FIG. 3 and FIG. 4 assumes a stereoscopic object, the object in a left eye image differs from the object in a right eye image in shape. Yet, if an object is not a stereoscopic object but a planar object, a shape of the object in a left eye image is identical to that of the object in a right eye image. If a position of the object in the left eye image is different from that of the object in the right eye image, a user is able to view the corresponding object in the perspective. To help the understanding of this disclosure, assume that a stereoscopic image in the following description is a planar object. Of course, it is apparent to those skilled in the art that the present invention is applicable to a stereoscopic object as well.

For clarity and convenience of the following description, assume that a mobile terminal mentioned in the following description includes at least one of the components shown in FIG. 1. In particular, a mobile terminal, to which the present invention is applicable, includes a display unit capable of providing a user with a 3D stereoscopic image by one of the above-described 3D stereoscopic image implementing schemes. In this case, the display unit has the concept of including such an external display device connectible by wire/wireless as a TV, a projector and the like as well as the display unit 151 provided to the mobile terminal itself. Preferably, such an external display device is able to display a 3D stereoscopic image by at least one of the above-described schemes. In case that the external display device is connected by wire, it is able to use such a wired interface via the interface unit 170 as USB (universal serial bus), HDMI (high definition multimedia interface), S-video (super video), DVI (digital visual interface), D-SUB (D-subminiature), AV terminal and the like. In case of wireless connection, the external device can be connected by a connection according to DLNA (digital living network alliance) standard) or such a wireless/short-range communication as 3G/4G data transmission, Wi-Fi, Bluetooth and the like.

Binocular Disparity According to Display Environment

As mentioned in the foregoing description, in order to implement a 3D stereoscopic image, a set of 1 source image's for implementing the 3D stereoscopic image is required. In particular, a source image for a left eye and a source image for a right eye, which differ from each other in viewpoint for a same object, are necessary to generate binocular disparity. In other words, one image for a left eye and another image for a right eye constitute a source image set for one 3D stereoscopic image. The bigger the binocular disparity (i.e., distance between viewpoints) becomes, the greater the 3D effect gets.

Yet, if the binocular disparity deviates from a predetermined distance, visual discomfort is caused to a user. When a 3D image generated from a set of source images is displayed, if a parallax substantially sensed by a user exceeds a distance corresponding to a space between both eyes of a user (e.g., a range within 7 cm in general despite personal difference), the visual discomfort is caused to the user. In particular, when a 3D image generated from a set of source images is displayed, a parallax substantially sensed by a user can depend on a parallax of the source images, a size of a display unit and/or a distance between the display unit and the user.

In more particular, a parallax sensed by a user is proportional to a parallax of source images itself and a size of a display unit or is inverse proportional to a distance between the display unit and the user. If the parallax of the source images itself increases, the size of the display unit increases, or the distance between the display unit and the user decreases, the parallax sensed by the user increases. On the contrary, if the parallax of the source images itself decreases, the size of the display unit decreases, or the distance between the display unit and the user increases, the parallax sensed by the user decreases.

Therefore, although same source images are used, a parallax sensed by a user can vary in accordance with an appreciation environment of a 3D stereoscopic image implemented via the same source images (i.e., a size of a display unit for displaying the corresponding 3D stereoscopic image, a distance between a user and the display unit, etc.). This is explained with reference to FIG. 6 as follows.

Figure 6:
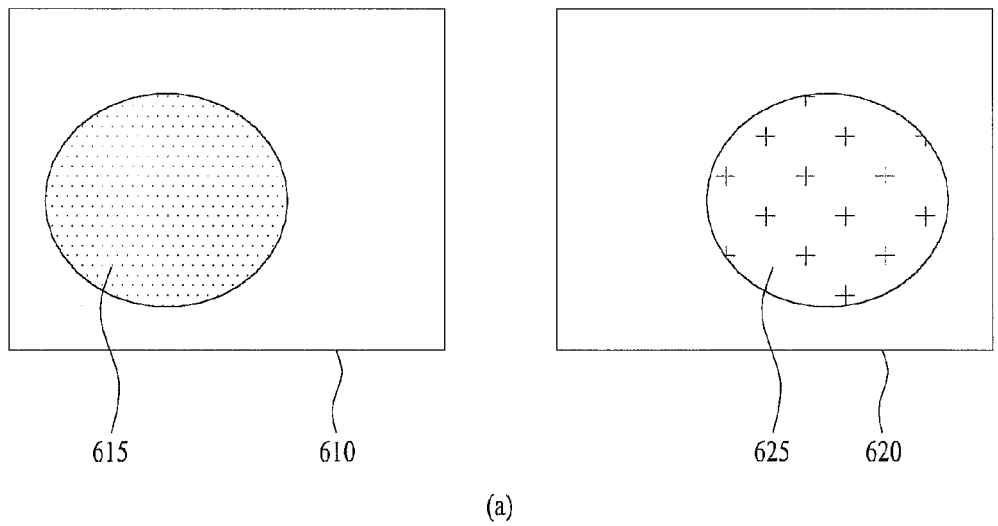
FIG. 6 is a diagram for describing a binocular disparity difference sensed by a user in accordance with a display environment.
Figure 6:
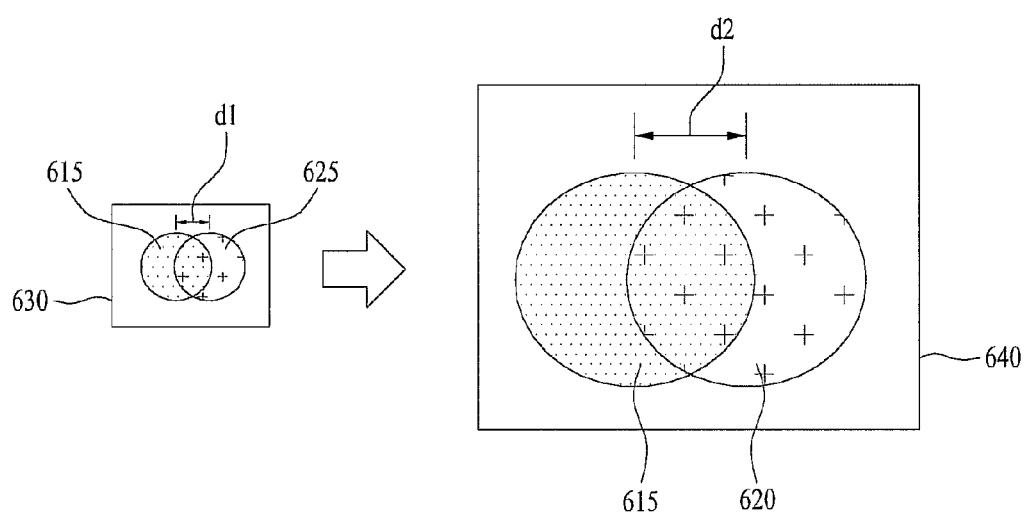

FIG. 6 is a diagram for describing a binocular disparity difference sensed by a user in accordance with a display environment.

In the following drawings including FIG. 6, for clarity, assume that a set of source images (or a source image set) for implementing a 3D stereoscopic image includes an image for a left eye (hereinafter named a left eye image) and an image for a right eye (hereinafter named a right eye image), which result from viewing a spherical object from different viewpoint, respectively. Yet, this assumption is just exemplary and non-limits the present invention. For instance, it is apparent to those skilled in the art that the present invention should be applicable to all kinds of source images for implementing a 3D stereoscopic image.

Referring to FIG. 6(*a*), for example of a set of source images for implementing a 3D stereoscopic image, a left eye image 610 and a right eye image 620, which result from viewing a spherical object 615 from different viewpoints, respectively, is prepared. Due to the viewpoint difference, a position of the spherical object 615 in the left eye image 610 is different from that of the spherical object 615 in the right eye image 620.

When a 3D stereoscopic image is implemented in a different display environment using the set of source images shown in FIG. 6(*a*), a difference of the binocular disparity sensed by a user is described with reference to FIG. 6(*b*) as follows.

Referring to FIG. 6(*b*), when a 3D stereoscopic image 630 is displayed on the display unit 151 provided to the mobile terminal, a parallax sensed by a user corresponds to a distance d1 between a center of an object 615 of a left eye image and a center of an object 625 of a right eye image. Meanwhile, when a 3D stereoscopic image 340 using a same source image is displayed on an external display device having a size greater than that of the display unit of the mobile terminal, a parallax sensed by the user corresponds to d2. If a distance between the user and the display unit 151 is equal to a distance between the user and the external display device, a difference between d1 and d2 is proportional to a size ratio of the dist unit to the external display device.

In this case, although the d1 is smaller than a distance causing visual discomfort to the user, if the d2 is greater than the distance causing the visual discomfort, it causes a problem that the user feels the visual discomfort in the 3D stereoscopic image appreciation via the external display device. To solve this problem, it may be able to reduce and fix the parallax of left/right image of the source image set itself in consideration of a maximum display size. However, this is disadvantageous in that the parallax sensed by the user is excessively decreased in such a relatively small display as the display unit 151 of the mobile terminal to reduce a 3D effect.

Implementation of 3D Stereoscopic Image by Selective Application of Source Image of At Lease Three Different Viewpoints In order to solve the above problem, the present invention proposes to implement a 3D stereoscopic image using two of images of a same object viewed in at least three different viewpoints in accordance with a display environment selectively.

In this case, the common object does not mean a partial specific object included in a 3D stereoscopic image implemented with a source image set but means a whole image included in the 3D stereoscopic image. In other words, since the left and right eye images configuring the source image differ from each other in viewpoint, although there can exist a partial difference due to a parallax of the source image, the common object means a substantially identical whole image.

In the following description, the concept and selective combination of images of a common object viewed in at least three different viewpoints according to the present invention are explained with reference to FIG. 7 and FIG. 8.

Figure 7:
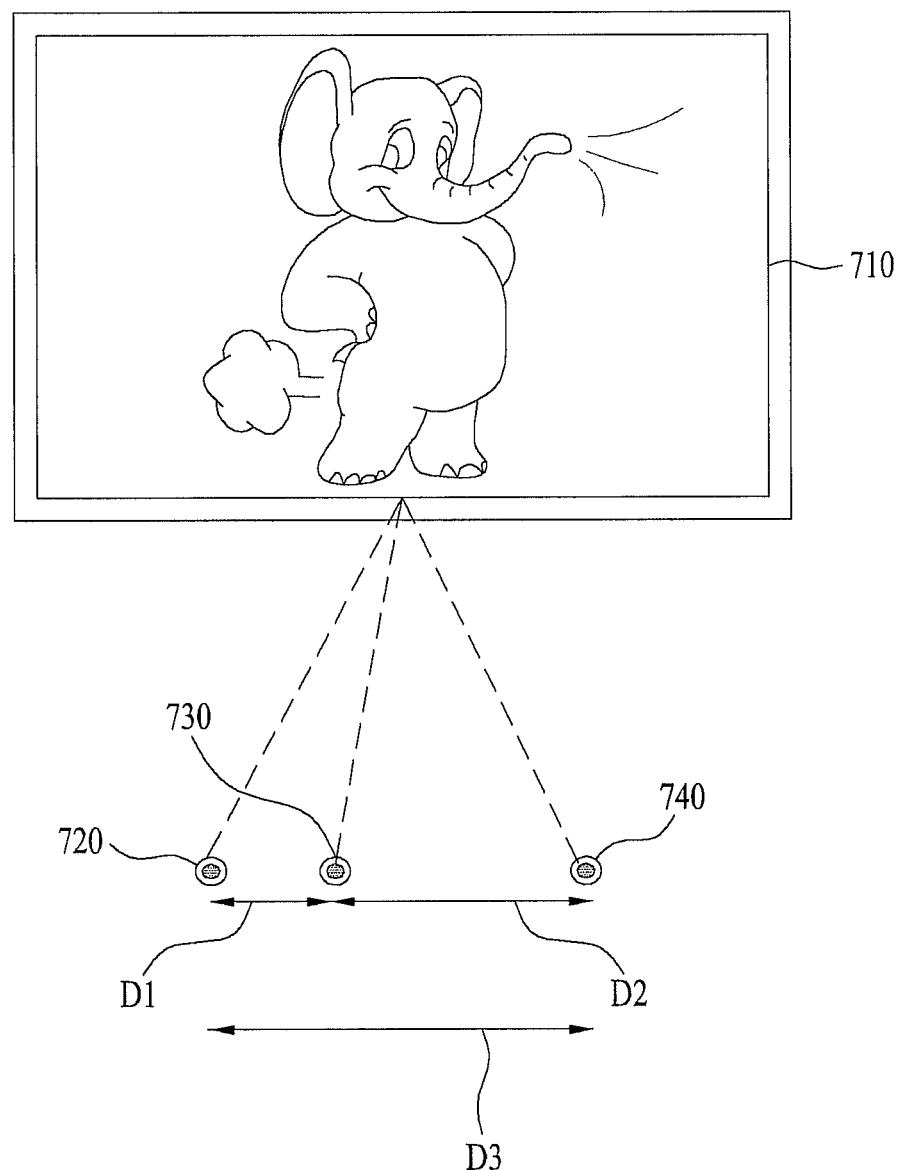
FIG. 7 is a diagram for one example of an image of a common object viewed in three different viewpoints according to one embodiment of the present invention.

FIG. 7 is a diagram for one example of an image of a common object viewed in at three different viewpoints according to one embodiment of the present invention.

Referring to FIG. 7, according to the present invention, an object 710 is prepared as a target o three different viewpoints is prepared. And, images resulting from viewing the common object 710 in three different points 720, 730 and 740 can be used as a source image set of the present invention.

Assuming that a distance D1 between the left viewpoint 720 and a center viewpoint 730 is different from a distance D2 between the center viewpoint 730 and the right viewpoint 740, it is able to implement a 3D stereoscopic image having three different parallaxes of the common object 710 using three images resulting from viewing the common object 710 in the viewpoints 720, 730 and 740, respectively.

Figure 8A:
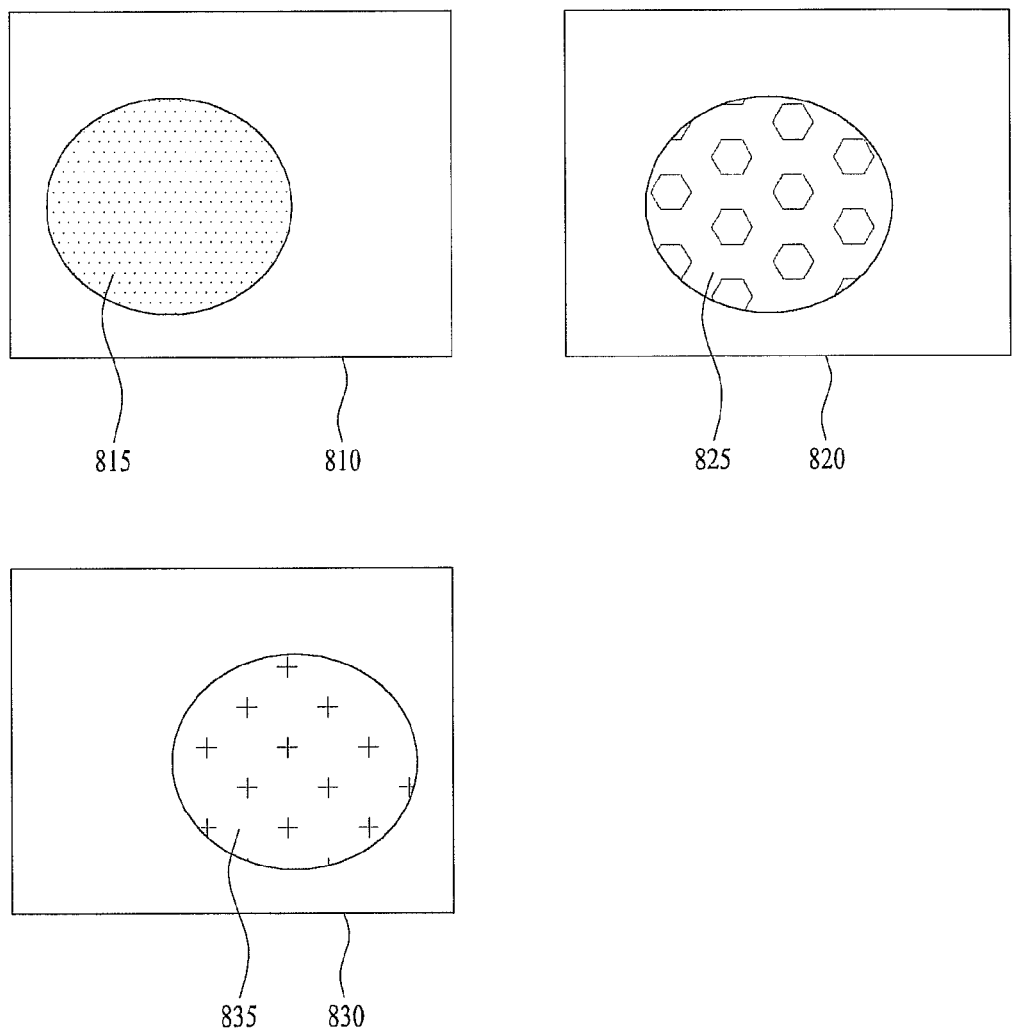
FIG. 8A is a diagram for one example of images resulting from viewing a common object in three different viewpoints.

FIG. 8A is a diagram for one example of images resulting from viewing a common object in three different viewpoints. In FIG. 8A, assume that the common object includes a spherical object.

Referring to FIG. 8A, in a source image 810 generated from viewing the common object in the first viewpoint among the three different viewpoints for the common object, a corresponding object 815 is position by inclining to the left.

In a source image 820 generated from viewing the common object in the second viewpoint among the three different viewpoints, a corresponding object 825 is nearly positioned at the center of the source image 820 by slightly deviating to the left from the center.

And, in a source image 830 generated from viewing the common object in the third viewpoint among the three different viewpoints, a corresponding object 835 is positioned by inclining to the right.

Using the three source images generated from viewing the same object in the three different viewpoints, as shown in FIG. 8A, one example of a method of implementing a 3D stereoscopic image in a manner of selecting two of the three images to constitute a set of source images in accordance with a display environment to provide a similar parallax sensed by a user is explained with reference to FIG. 8B as follows.

Figure 8B:
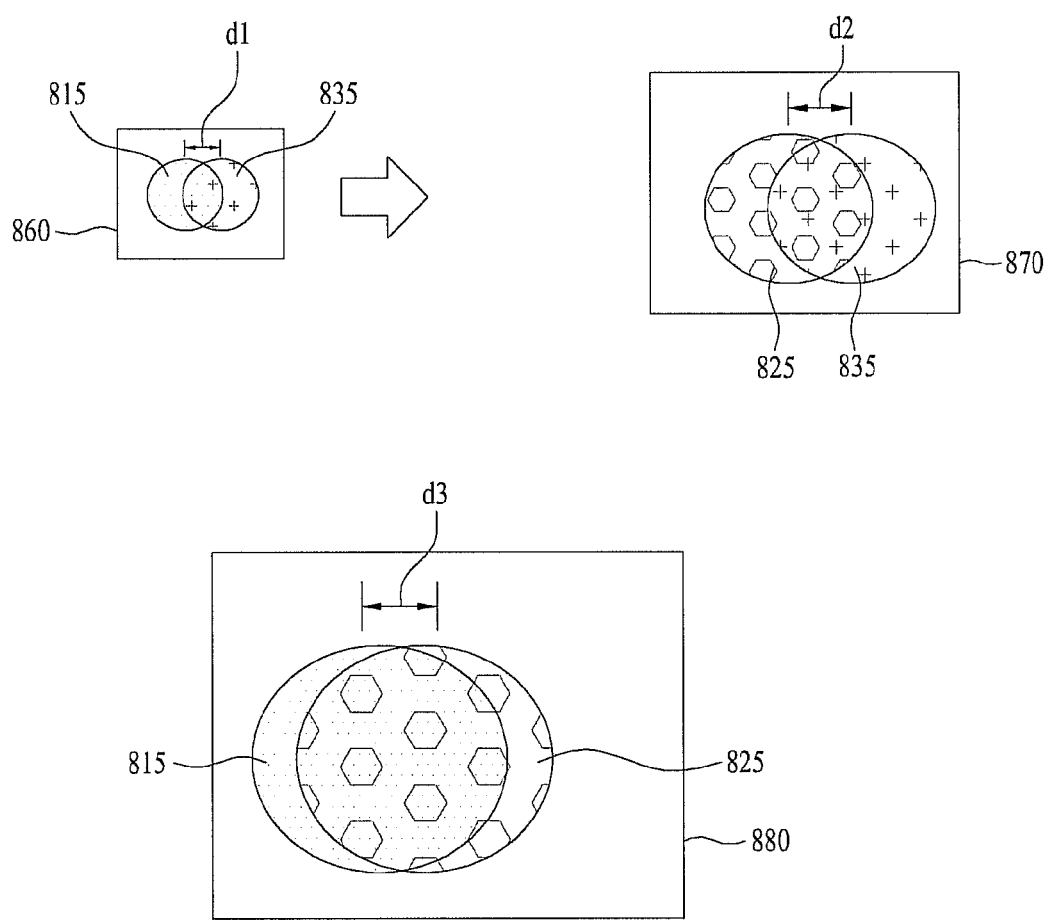
FIG. 8B is a diagram for one example of a combination of images resulting from viewing a common object in three different viewpoints in accordance with a size of a display unit.

FIG. 8B is a diagram for one example of a combination of source images resulting from viewing a common object in three different viewpoints in accordance with a size of a display unit.

Referring to FIG. 8B, first of all, assume that three display units differing from each other in size are provided. And, assume that a distance between a user and each of the three display units is equal. In this case, each of the three display units can include the display unit 151 provided to the mobile terminal 100 itself. Alternatively, each of the three display units can include an external display device connected to the mobile terminal 100 by wire/wireless.

A 3D stereoscopic image can be implemented on the smallest one 860 of the three display units in a following manner.

First of all, the source images 810 and 830 shown in FIG. 8A are combined together in a manner that a space between the spherical objects 815 and 835 is set to the greatest (i.e., a parallax of a source image set itself is set to the greatest). In this case, the parallax sensed by a user corresponding to the distance dl.

Secondly, the source images 820 and 830 shown in FIG. 8A are combined together in a manner that a parallax of a source image set itself is set to a middle size. In this case, the parallax sensed by a user corresponding to the distance d2.

Thirdly, the source images 810 and 820 shown in FIG. 8A are combined together in a manner that a parallax of a source image set itself is set to the smallest. In this case, the parallax sensed by a user corresponding to the distance d3.

Consequently, even if the display unit increases in size, the parallax sensed by the user can be maintained in a predetermined range d1~d3 by the appropriate combination of the source images differing from each other in viewpoint.

Thus, the user is able to sense the similar parallax irrespective of a display size in a manner of combining two of the three source images of the different viewpoints to reduce the parallax of the source image in case of increasing the size of the display unit or combining two of the three source images of the different viewpoints to raise the parallax of the source image in case of decreasing the size of the display unit Of course, the method of making the similar parallax is one example of the combination. In order to maintain the 3D effect sensed by the user as maximum as possible, the combination can be performed in a manner of maintaining a maximum parallax smaller than a parallax that causes visual discomfort to the user.

Figure 9:
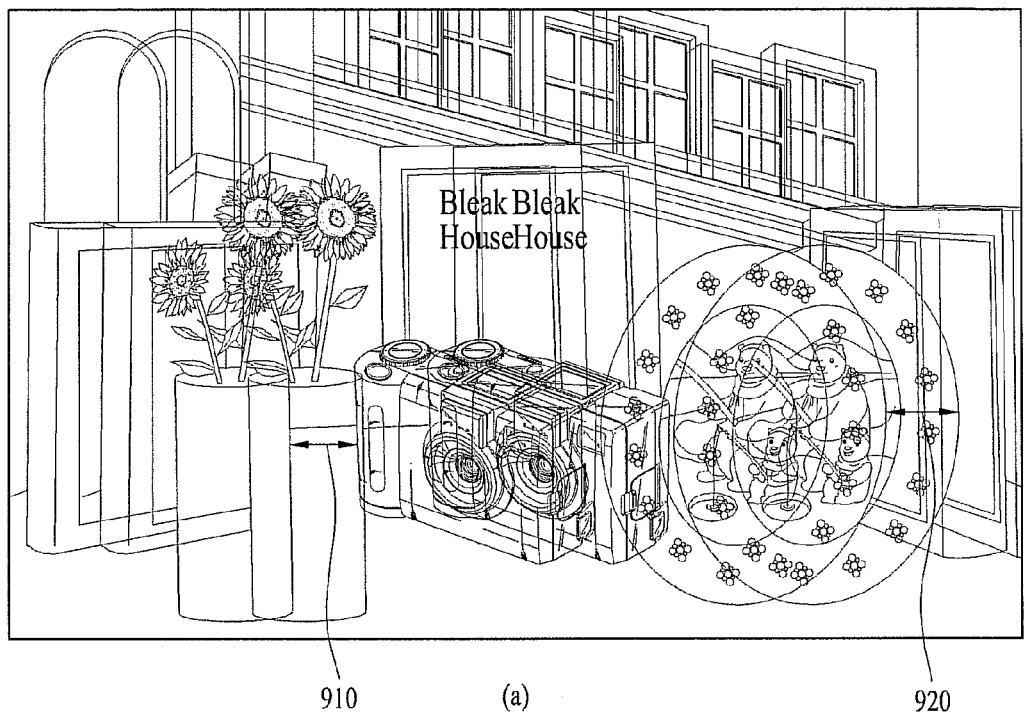
FIG. 9 is a diagram of display screen configurations of a detailed object in a source image combination described with reference to FIG. 8A and FIG. 8B.
Figure 9:
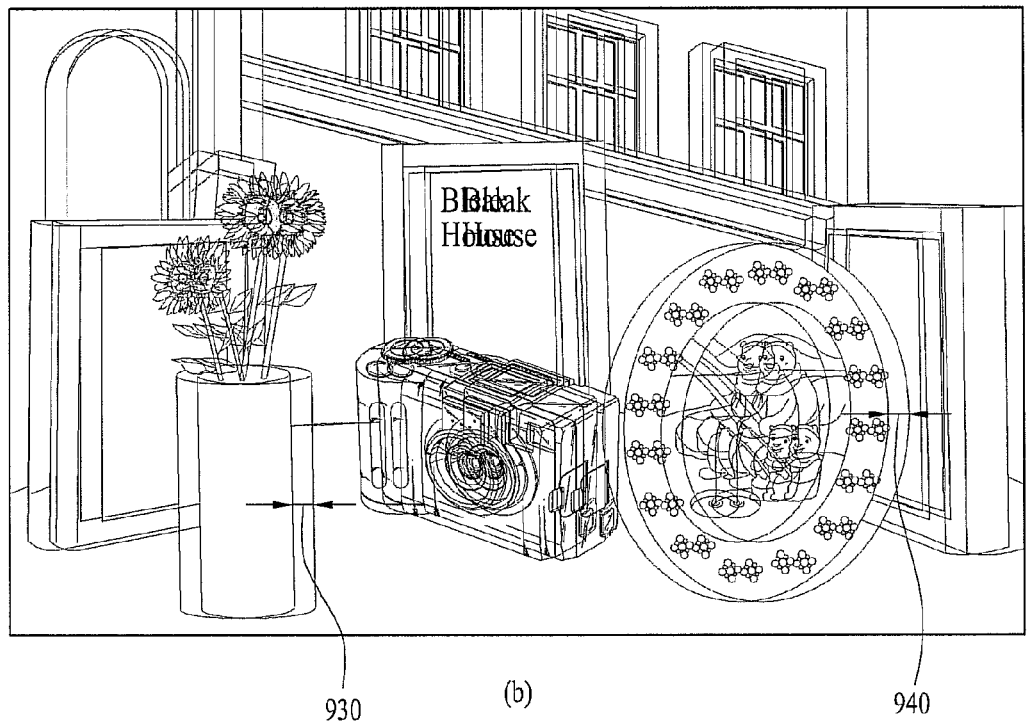

FIG. 9 is a diagram of display screen configurations of a detailed object in a source image combination described with reference to FIG. 8A and FIG. 8B.

Referring to FIG. 9, in case that a size of a display unit is relatively small, a 3D effect can be increased in a manner of combining source images having a big parallax 910 between common objects in left and right eye images with a source image set having a big parallax 920 between common objects in the left and right eye images [FIG. 9(*a*)]. On the contrary, in case that a size of a display unit is relatively big, visual fatigue of a user can be reduced in a manner of combining source images having a small parallax 930 between common objects in left and right eye images with a source image set having a small parallax 924 between common objects in the left and right eye images [FIG. 9(*b*)].

According to the above-described embodiments, a 3D stereoscopic image is selectively implemented with reference to three viewpoints using source images generated from viewing a common object in each of a plurality of different viewpoints, for example, by which the present invention is non-limited. The present invention is applicable to a method of using source images generated from viewing a common object in more viewpoints. This is explained with reference to FIG. 10 as follows.

Figure 10:
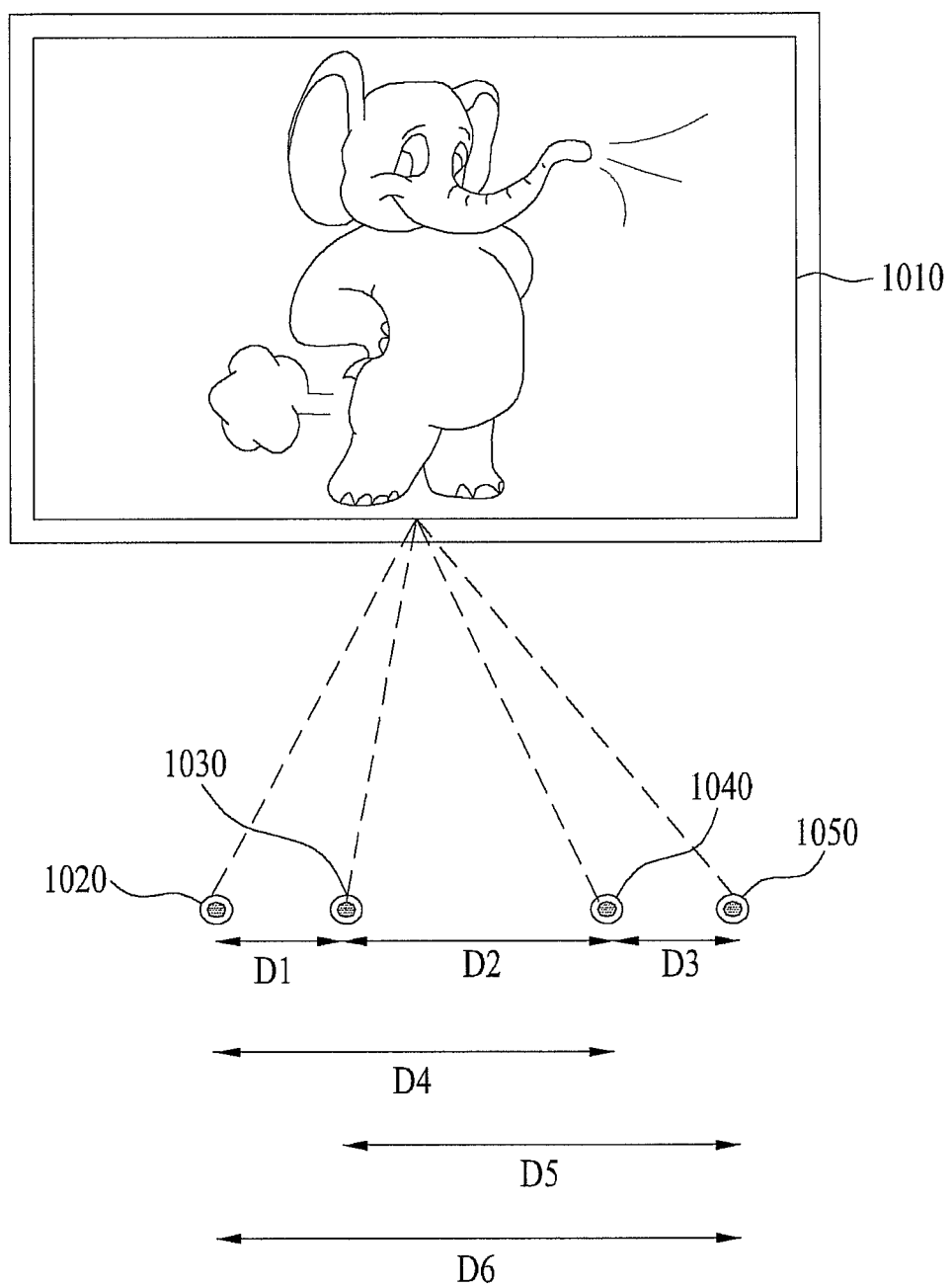
FIG. 10 is a diagram for one example of an image of a common object viewed in four different viewpoints according to one embodiment of the present invention.

FIG. 10 is a diagram for one example of an image in four different viewpoints for a common object according to one embodiment of the present invention.

Referring to FIG. 10, an object 1010 is prepared as a target of four different viewpoints of the present invention. In this case, images generated from viewing the common object 1010 in each of the four different viewpoints 1020, 1030, 1040 and 1050 can be used as a source image of the present invention.

Assuming that a distance D1 between a far-left viewpoint 1020 and a center left viewpoint 1030, a distance D2 between the center left viewpoint 1030 and a center right viewpoint 1040 and a distance D3 between the center right viewpoint 1040 and a far-right viewpoint 1050 are different from one another, it is able to implement six kinds of 3D stereoscopic images differing from each other in parallax for the common object 1010 using four images generated from viewing the common object 1010 in the viewpoints, respectively.

In particular, when there are many viewpoints differing from each other in viewing a common object, if more viewpoint-to-viewpoint distances differ from each other, a parallax of a source image set is adjusted using more combinations. Therefore, it is able to provide a user with a 3D stereoscopic image having an optimal parallax.

The combination of the different viewpoint images for the same object can be determined by a user's input through the user input unit 130. Alternatively, the controller 180 is able to automatically determine the combination of the different viewpoint images for the same object by recognizing a display environment.

For instance, when a user is appreciating a 3D stereoscopic image using at least three source images differing from each other in viewpoint according to the present invention, if the user senses visual discomfort or intends to adjust a level of a 3D effect, a combination for generating the 3D stereoscopic image can be changed in accordance with a prescribed input through the user input unit 130. In particular, after combinations have been mapped to a plurality of key buttons amounting to the number of the combinations in accordance with the number of different viewpoint images for a common object, respectively, a 3D stereoscopic image can be displayed through the combination corresponding to a manipulated one of the key buttons. Moreover, after a key button for a combination change has been prepared, if the prepared key button is manipulated, the combination can be changed.

For another instance, the controller 180 recognizes a type (i.e., size) of the display, on which a 3D stereoscopic image is being displayed, and then controls source images to be automatically combined to form a source image set with an optimal parallax. In particular, in case that a 3D stereoscopic image is implemented through the display unit 151 of the mobile terminal 100, the controller 180 selects a combination of source images to enable a user to sense a biggest parallax. In case that a 3D stereoscopic image is implemented via a large-scale LCD TV connected to the mobile terminal, the controller 180 is able to select a combination of source images to enable a user to sense a smallest parallax.

Optionally, it is a matter of course that both of the above-described automatic and manual selections can be implemented together.

Camera Arrangement Structure for Photographing Images of Common Object in Different Viewpoints In the following description, a method of using at least one or more cameras is explained as a method of generating source images of a common object in at least three viewpoints. In case that a camera is used, a common object can be called a common subject.

First of all, a method of using a single camera is explained with reference to FIG. 11 and FIG. 12 as follows.

Figure 11:
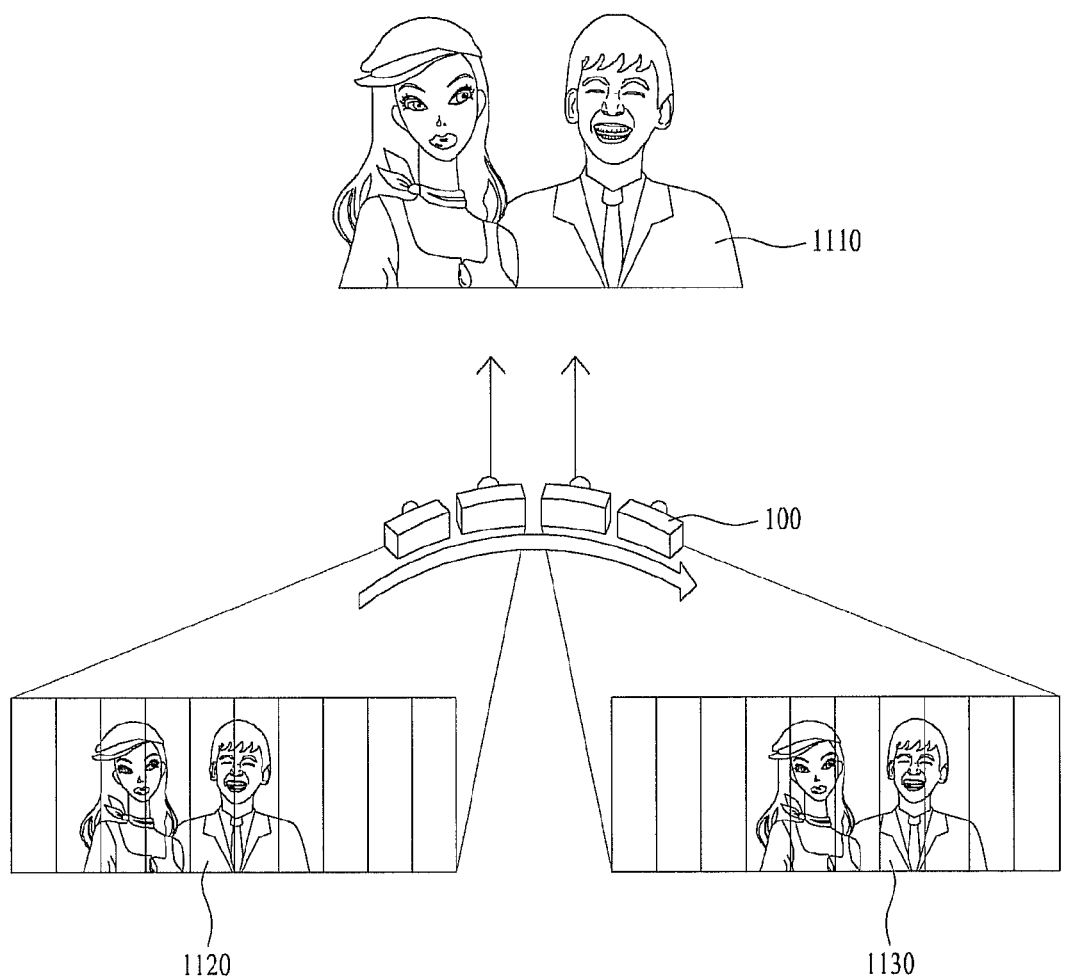
FIG. 11 is a diagram for one example of a method of photographing a source image via one camera according to one embodiment of the present invention.

FIG. 11 is a diagram for one example of a method of photographing a source image via one camera according to one embodiment of the present invention.

Referring to FIG. 11, using a single camera provided to the mobile terminal 100, it is able to generate source images 1120 and 1130 of a common subject 1110 in different viewpoints by sweep panoramic scheme. In this case, the sweep panoramic scheme means a method of generating a left eye image and a right eye image in a manner of attaching single images, which are photographed by moving a camera in one direction, to one another with a prescribed interval.

Figure 12:
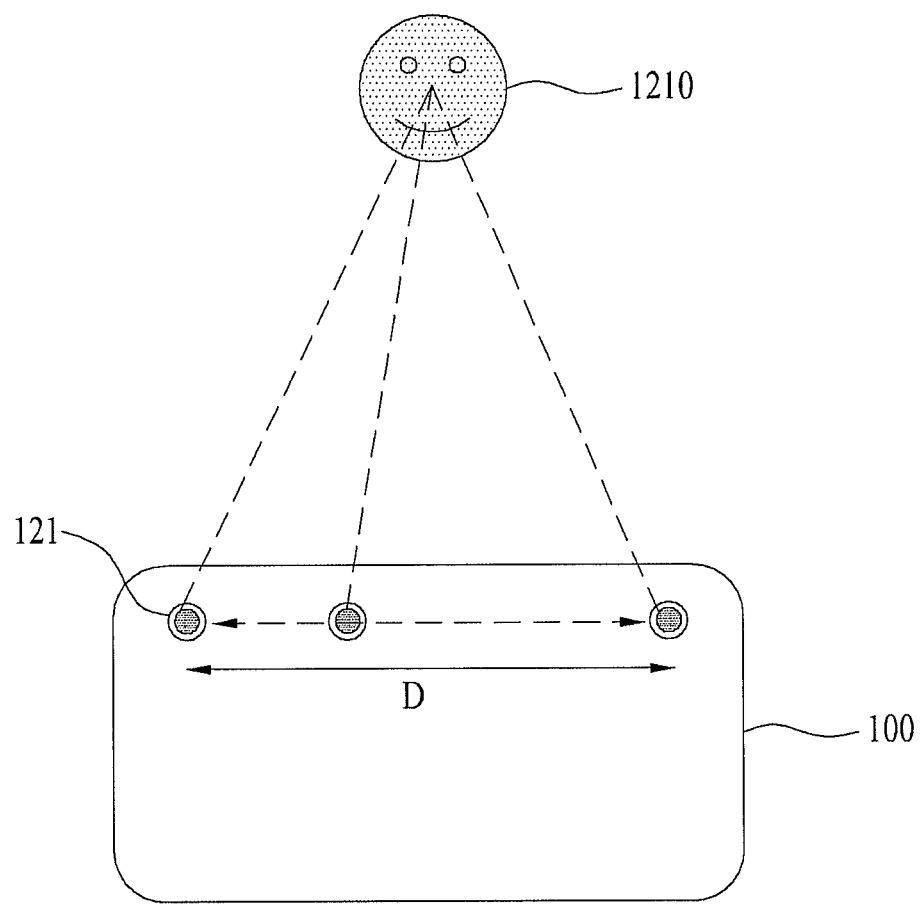
FIG. 12 is a diagram for another example of a method of photographing a source image via one camera according to one embodiment of the present invention.

FIG. 12 is a diagram for another example of a method of photographing a source image via one camera according to one embodiment of the present invention.

Referring to FIG. 12, a single camera 151 can be provided to the mobile terminal 100 in a manner of moving on a prescribed reciprocating track. Using the mobile terminal in this structure, it is able to obtain source images of the present invention in a manner of photographing a subject 1210 at least three times by changing a position of the camera on the track D. In this case, a length of the track is preferably set not to exceed a length of a parallax that causes the aforesaid visual fatigue to a user.

In the following description, a method of using two cameras is explained with reference to FIGS. 13 to 15.

Figure 13:
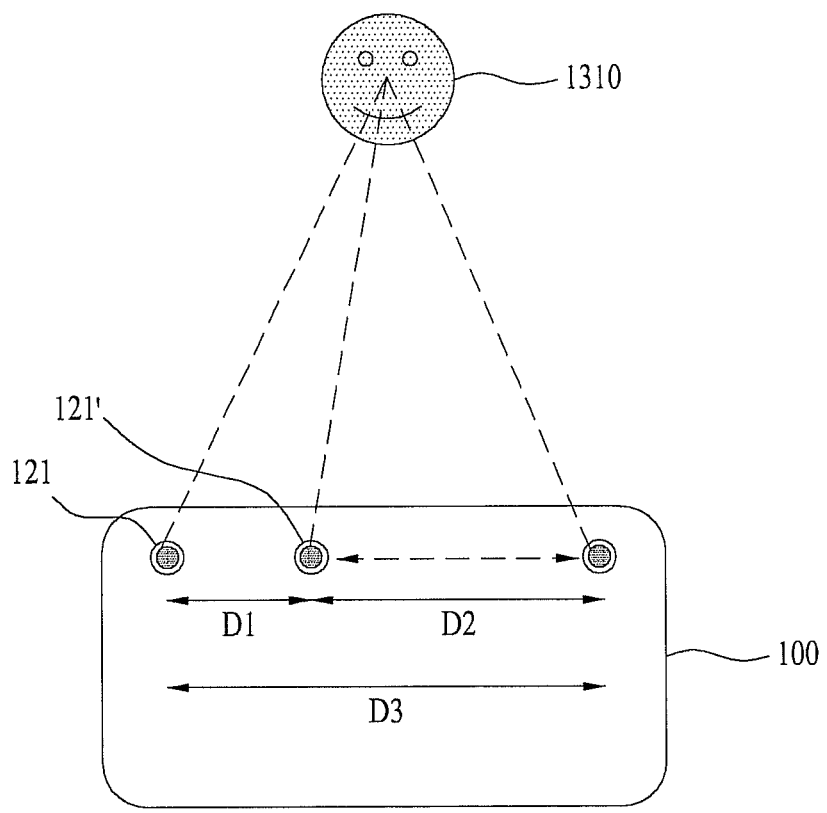
FIG. 13 is a diagram for one example of a method of photographing a source image via two cameras according to one embodiment of the present invention.

FIG. 13 is a diagram for one example of a method of photographing a source image via two cameras according to one embodiment of the present invention.

Referring to FIG. 13, one camera 151 is fixed to the mobile terminal 100, while the other camera 151' is installed to be movable on a prescribed reciprocating track D2. Using the mobile terminal in this structure, it is able to obtain source images (including an image taken via the fixed camera) of the present invention in a manner of photographing a subject at least two times by changing positions of the cameras on the track. In this case, a maximum distance D3 between the two cameras is preferably set not to exceed a length of a parallax that causes the aforesaid visual fatigue to a user.

Figure 14:
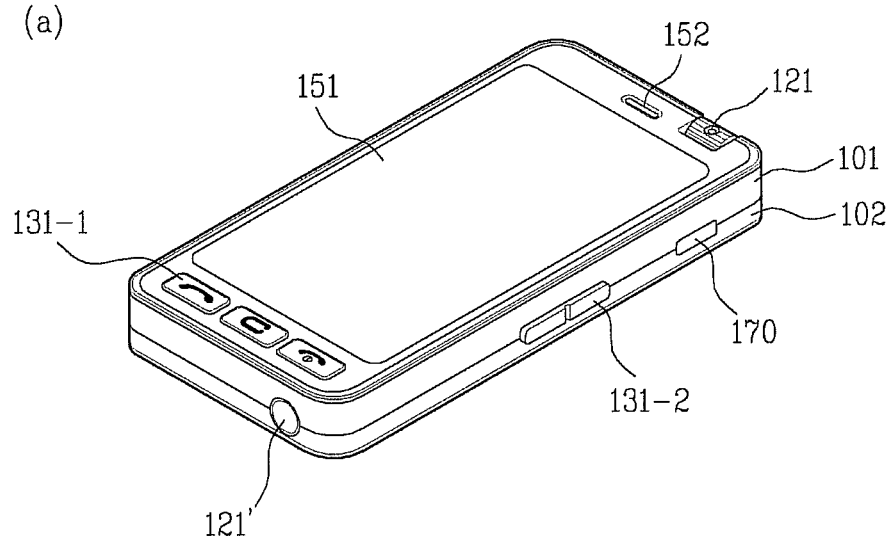
FIG. 14 is a perspective diagram for one example of an apparatus for photographing a source image via two cameras according to one embodiment of the present invention.
Figure 14:
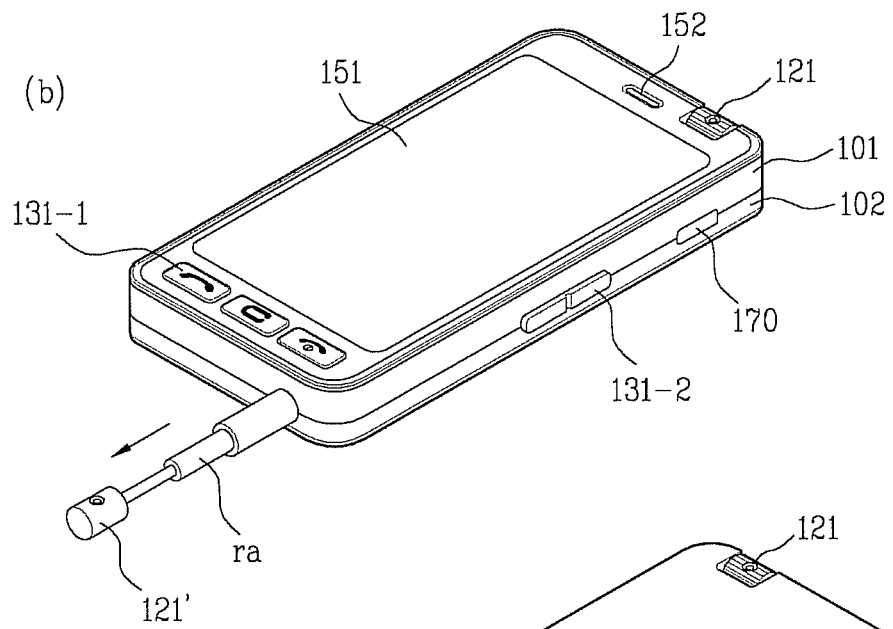
Figure 14:
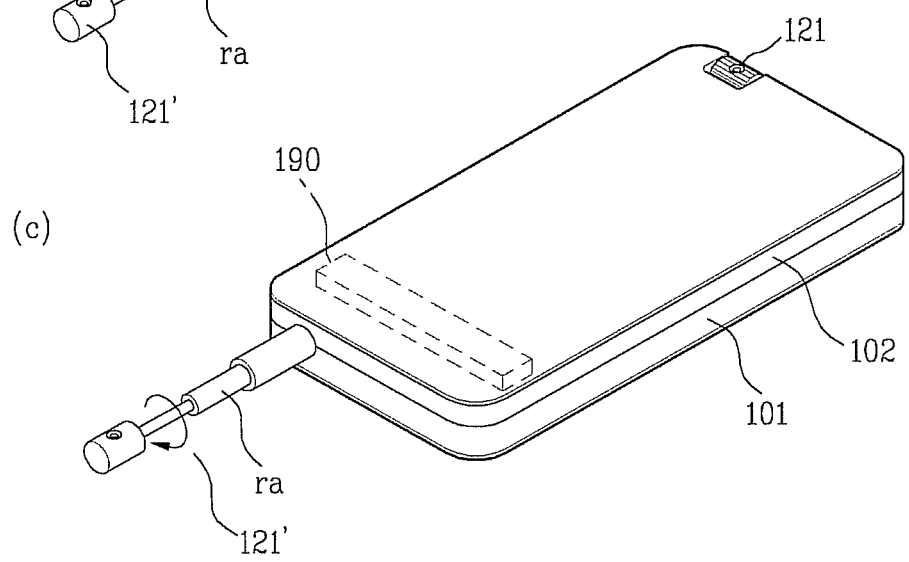

FIG. 14 is a perspective diagram for one example of an apparatus for photographing a source image via two cameras according to one embodiment of the present invention.

In particular, FIG. 14(a) is a front perspective diagram of a mobile terminal according to another embodiment of the present invention. FIG. 14(b) is a front perspective diagram of the mobile terminal according to the present invention, in which an operational state of the mobile terminal is shown. And, FIG. 14(c) is a rear perspective diagram of the mobile terminal according to the present invention.

Referring to FIG. 14, like the description of the former embodiment, the embodiment shown in FIG. 14 includes a pair of cameras 121 and 121'. In particular, the first camera 121 is rotatably installed at one length-direction end portion of a mobile terminal body including a first case 101 and a second case 102. And, the second camera 121' can be retractably loaded in a bottom side among lateral sides o the mobile terminal body including the first case 101 and the second case 102.

The first camera 121 can be rotatably installed at one end of an overlapping pipe member that is extendible and contractible. The first camera 121 can be rotatably installed centering on a rotation shaft (not shown in the drawing) in parallel with an insertion or withdrawal direction.

A withdrawal length of the second camera 121' can be adjusted by a multi-step retractable overlapping pipe member ra. And, the second camera 121' can be rotatably loaded to be rotatable using the multi-step retractable overlapping pipe member ra as a rotation shaft when the second camera 121' is withdrawn.

According to the embodiment shown in FIG. 14, the first camera 121 is rotatable in front and rear directions of the mobile terminal and the withdrawal length of the multi-step retractable overlapping pipe member ra is adjustable, whereby a spaced distance between the first camera 121 and the second camera 121' can be adjusted.

Therefore, it is able to obtain images of a same object in at least three different viewpoints using an image photographed via the first camera, an image photographed in a first withdrawal length of the second camera and an image photographed in a second withdrawal length of the second camera.

Meanwhile, it is also able to obtain an image having a different parallax by adjusting a distance from a subject. This is explained with reference to FIG. 15 as follows.

Figure 15:
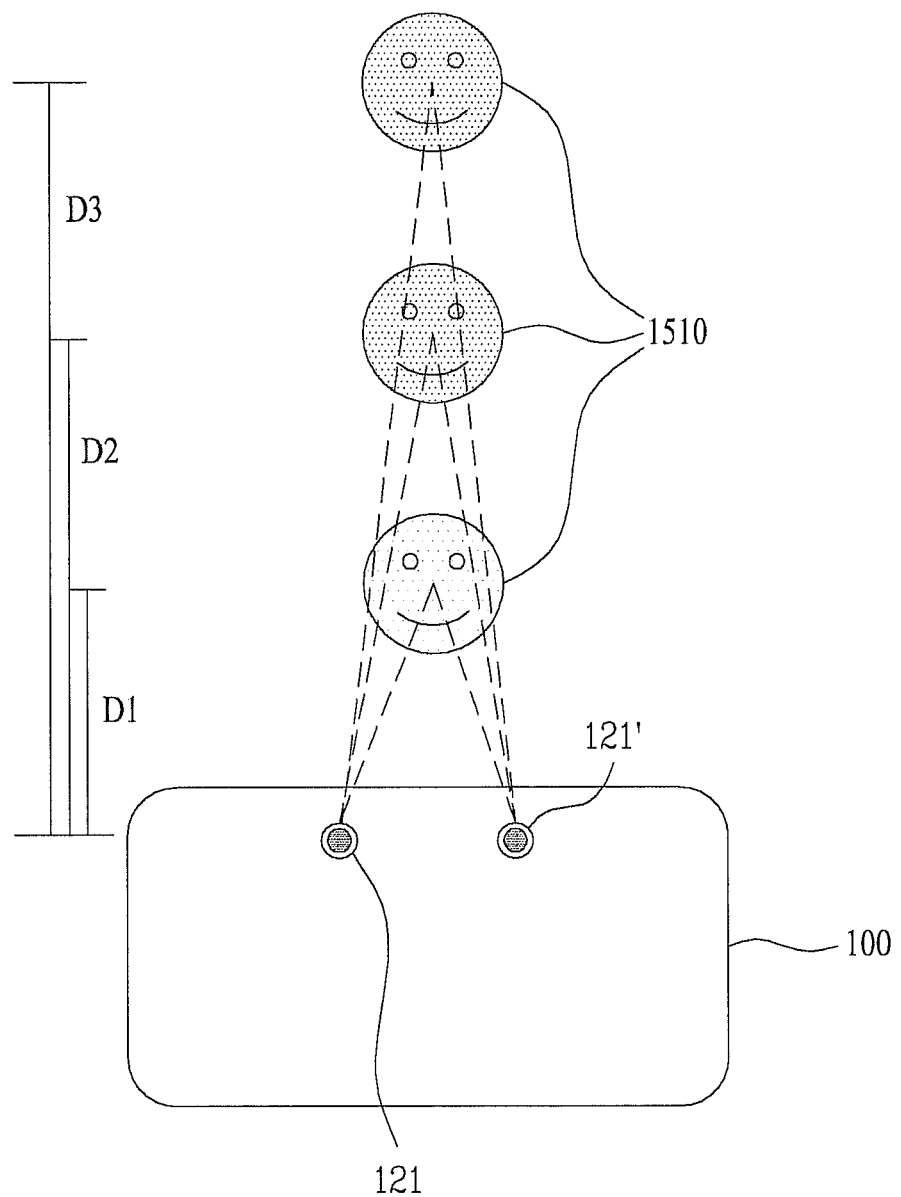
FIG. 15 is a diagram for another example of a method of photographing a source image via two cameras according to one embodiment of the present invention.

FIG. 15 is a diagram for another example of a method of photographing a source image via two cameras according to one embodiment of the present invention.

Referring to FIG. 15, a pair of cameras 151 and 151' are arranged on the mobile terminal 100 to have a fixed distance in-between. And, it is able to obtain a source image of a subject 1510 in a different viewpoint by a method of photographing the subject by changing a distance between the subject 1510 and each of the cameras 151 and 151' from D1 to D3.

In the aforesaid embodiments of the present invention, the source image can include a still picture or a moving picture. The source image is previously stored in the memory 160 or can be transmitted as a stream by wire/wireless.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned image displaying apparatus can be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for displaying an image, comprising:
   a display unit configured to display a perceived three-dimensional (3D) image;
   a first camera device to capture a first image of the object from a first viewpoint;
   a second camera device to capture a second image of the object from a second viewpoint, and to capture the third image of the object from a third viewpoint, wherein the second camera device includes a multi-step retractable pipe member and a camera attached to an end point of the multi-step retractable pipe member, wherein the second viewpoint is based on the pipe member being at a first position relative to a body of the apparatus, and the third viewpoint is based on the pipe member being at a second position that is extended from the first position;
   a memory unit configured to store the first image of the object from the first viewpoint, the second image of the object from the second viewpoint and the third image of the object from the third viewpoint;
   an interface unit to connect via a wire or to wirelessly connect to an external display device for displaying the perceived 3D image; and
   a controller configured to control the interface unit to display the perceived 3D image on the external display device by using a combination of two images from among the obtained first, second and third images, wherein the combination of two images is based on a size of the external display device.

2. The apparatus of claim 1, wherein the controller controls the perceived 3D image to be displayed by using the first image and the second image without using the third image.

3. The apparatus of claim 1, wherein the controller controls the perceived 3D image to be displayed by using the first image and the third image without using the second image.

4. The apparatus of claim 1, further comprising a user input unit to receive a command input from a user, wherein a display condition is determined based on the command received via the user input unit.

5. The apparatus of claim 1, wherein a display condition is a presence or a non-presence of a wired connection of the external display device.

6. The apparatus of claim 1, wherein the displayed 3D image is a perceived 3D stereoscopic image of a binocular disparity type.

7. The apparatus of claim 1, wherein the display unit includes a display device, a switch liquid crystal (LC) device and an optical parallax barrier.

8. The apparatus of claim 1, wherein the first camera device is provided at a first end portion of the body of the apparatus, and the second camera device is provided at a second end portion of the body of the apparatus, wherein the second end portion is an opposite end portion than the first end portion.

9. The apparatus of claim 1, wherein a camera of the first camera device to rotate about a first axis, and the camera of the second camera device to rotate about a second axis that is transverse to the first axis.

10. A method of controlling an image display device, the method comprising:
    obtaining a first image of an object from a first viewpoint by using a first camera device;
    obtaining a second image of the object from a second viewpoint by using a second camera device, wherein the second camera device includes a multi-step retractable pipe member and a camera attached to the multi-step retractable pipe member, wherein the second viewpoint is based on the pipe member being at a first position;
    obtaining a third image of the object from a third viewpoint by using the second camera device, wherein the third viewpoint is based on the pipe member being at a second position that is extended from the first position;
    displaying a perceived three-dimensional (3D) image on a display unit by using the obtained first, second and third images;
    connecting, via an interface unit, to an external display device for displaying the perceived 3D image; and
    controlling the interface unit to display the perceived 3D image via the external display device by using a combination of two images from among the obtained first, second and third images, wherein the combination of two images is based on a size of the external display device.

11. The method of claim 10, wherein when a first display condition is determined, the perceived 3D image is displayed by using the first image and the second image without using the third image.

12. The method of claim 10, wherein when a second display condition is determined, the perceived 3D image is displayed by using the first image and the third image without using the second image.

13. The method of claim 10, further comprising determining a first display condition by determining a display command inputted via a user input unit from a user.

14. The method of claim 10, further comprising determining a first display condition by determining whether the image display device is wire connected or wirelessly connected to the external display device for displaying the 3D image.

15. The method of claim 10, wherein the first camera device is provided at a first end portion of a body of the apparatus, and the second camera device is provided at a second end portion of the body of the apparatus, wherein the second end portion is an opposite end portion than the first end portion.

16. A method of controlling a three-dimensional (3D) image, the method comprising:
   obtaining a first image of an object from a first viewpoint by using a first camera device;
   obtaining a second image of the object from a second viewpoint by using a second camera device, wherein the second camera device includes a multi-step retractable pipe member and a camera attached to the multi-step retractable pipe member, wherein the second viewpoint is based on the camera being at a first position;
   obtaining a third image of the object from a third viewpoint by using the second camera device, wherein the third viewpoint is based on the camera being at a second position that is extended from the first position;
   displaying, on a display screen, a perceived 3D image by using a first combination of two images from among the obtained first, second and third images;
   receiving, via a user input unit, a user input for changing a combination of images; and
   when the user input is received, displaying, on the display screen, the perceived 3D image by using a second combination of two images from among the obtained first, second and third images.

17. The method of claim 16, wherein the first camera device is provided at a first end portion of a body of the apparatus, and the second camera device is provided at a second end portion of the body of the apparatus, wherein the second end portion is an opposite end portion than the first end portion.

* * * * *